United States Patent [19]

Carandang

[11] 4,366,002
[45] Dec. 28, 1982

[54] NON-VOLATILE HOT STRIPPER

[75] Inventor: Carmen M. Carandang, Oaks, Pa.

[73] Assignee: Amchem Products, Inc., Ambler, Pa.

[21] Appl. No.: 311,058

[22] Filed: Oct. 13, 1981

Related U.S. Application Data

[63] Continuation-in-part of Ser. No. 197,135, Oct. 15, 1980, abandoned.

[51] Int. Cl.$^3$ .............................................. C03C 23/00
[52] U.S. Cl. ........................................ 134/2; 134/38; 252/103; 252/158; 252/170; 252/173; 252/174.21; 252/174.22
[58] Field of Search ............... 252/156, 158, 170, 173, 252/103, 174.21, 174.22, DIG. 8; 134/2, 38; 264/344

[56] References Cited

U.S. PATENT DOCUMENTS

| | | | |
|---|---|---|---|
| 3,335,092 | 8/1967 | Perry | 252/158 |
| 3,551,340 | 12/1970 | Skinner | 252/156 |
| 3,847,839 | 11/1974 | Murphy et al. | 252/544 |
| 4,090,001 | 5/1978 | Maillard et al. | 252/156 X |

FOREIGN PATENT DOCUMENTS 2436488 2/1976 Fed. Rep. of Germany.

OTHER PUBLICATIONS

Bulletins 205—B, 206—B, The Quaker Oats Co., Chemical Div. 1971.

*Primary Examiner*—Thurman K. Page
*Attorney, Agent, or Firm*—Alexis Barron

[57] ABSTRACT

An aqueous alkaline composition having increased effectiveness and bath life when used at elevated temperatures to remove siccative coatings from substrates coated therewith containing one or more alkaline compounds and at least two of the following three materials: tetrahydrofurfuryl alcohol, an ethoxylated furfuryl alcohol and an ethoxylated tetrahydrofurfuryl alcohol; and preferably containing one or more of a sequestering agent, a composition-stabilizing compound, and a surfactant.

22 Claims, No Drawings

NON-VOLATILE HOT STRIPPER

CROSS-REFERENCE TO RELATED APPLICATION

This is a continuation-in-part of application Ser. No. 197,135, filed Oct. 15, 1980 now abandoned.

FIELD OF THE INVENTION

This inventon relates to removing siccative coatings from substrates coated therewith and more particularly, to an aqueous alkaline solution which is effective in removing siccative coatings from substrates.

Although the present invention has broader applicability, it will be described in connection with the stripping of siccative coatings from metal substrates, such as steel panels. The term "siccative coatings" means those protective and/or decorative coatings such as shellac, varnishes, phenolic varnishes, paints of the drying-oil types, cathodic electrodeposition paints, and paints which fall into the classes of alkyds, modified alkyds, modified phenolics, modified melamines, baked phenolics, epoxy-resins, polyurethanes, silicones, acrylics, vinyls, and the like.

Compositions which are effective in removing siccative coatings from a wide variety of substrates, including wood and metals, are known. They find utility in such diverse applications as furniture stripping and in similar applications which may be characterized as home restoration applications, as well as in industrial applications, such as in the automotive industry wherein protective, siccative coatings that have been applied to various component parts are removed prior to final painting and finishing.

REPORTED DEVELOPMENTS

The simplest of the stripping compositions comprises an aqueous alkaline solution, which can be used at high temperatures (usually a rolling boil) and which is believed to function by breaking ester or ether linkages, which hold the polymer units of the paint film together, and by forming the corresponding soaps. This is a relatively slow process in which alkaline base is consumed and contaminants are formed in the composition.

An improvement over the use of simple solutions of alkaline bases at high temperatures may be obtained by adding to the solution a wetting agent which accelerates the stripping operation by penetrating or permeating the paint film subsequent to partial removal thereof by degradation. Additional improvements can be realized by the use of detergents and emulsifiers which further accelerate the stripping process by deterging and emulsifying or solubilizing plasticizer and unpolymerized binder in the paint film.

Thus, in formulating a composition for removing or stripping siccative coatings from substrates coated therewith, it is desirable to obtain a formulation that will act in one or more of the following ways: to break ester or ether linkages using strong alkali; to deterge and emulsify plasticizer or other components of lower molecular weights with appropriate surfactants; to permeate cracks and fissures in the paint, especially through voids or around pigment particles by a wetting-out action; to dissolve water-soluble solvent in resinous polymers to facilitate permeation; to dissolve soaps formed by reaction with the alkali, using primary alcohols and glycols to avoid having these soaps hinder further reaction; and to break the bond between the substrate and the paint film by whatever means possible, including superficial action on the substrate by use of sequestrants. Preferably, the stripper composition will penetrate the paint film rapidly and with only limited disintegration of the film.

Although the aforementioned aqueous alkaline compositions, which are employed at elevated temperatures and which are often characterized as "hot stripper compositions", are generally effective in removing most siccative finishes, they are ineffective in removing cathodic electrodeposition paints and are not particularly effective in removing certain paints such as acrylics and vinyls which have carbon-to-carbon linkages. With acrylic and vinyl paints, penetration and bond-breaking mechanisms are of primary importance and the paint tends to be sheeted off with little disintegration.

It has previously been discovered that the addition of furfuryl alcohol to such hot stripper compositions results in a composition that is effective in removing acrylic and vinyl paints as well as cathodic electrodeposition paints. The furfuryl alcohol may be referred to as a composition-activating compound in that it penetrates the paint film allowing attack on the substrate to paint film bonds. Another composition-activating compound is tetrahydrofurfuryl alcohol. Additionally, it is known that a combination of these two activators results in a composition that is more effective than a composition containing either one of the activators alone. Another material which has been used in stripping compositions is an alkoxylated furfuryl alcohol.

Problems have been encountered in the use of various of the known stripping compositions. For example, furfuryl alcohol forms with water an azeotrope, the boiling point of which falls within the operative temperature range for the hot stripper composition. Thus, with continued use, the activator is lost as it is boiled off. Therefore, the bath of the composition must either be dumped and a fresh bath formulated, or the furfuryl alcohol and water lost must be continuously or periodically replaced.

The present invention relates to the provision of a hot stripper compositon having increased effectiveness and bath life and one that is particularly effective in the stripping of electrodeposited paint films.

SUMMARY OF THE INVENTION

In accordance with this invention, there is provided an aqueous alkaline composition having increased stripping effectiveness and prolonged bath life when used at elevated temperatures and comprising: one or more alkaline compounds in an amount effective to impart to the composition a pH of about 9.5 to about 14+; and at least two of the following three materials: tetrahydrofurfuryl alcohol, an ethoxylated furfuryl alcohol, and an ethoxylated tetrahydrofurfuryl alcohol, said ethoxylated materials represented by Formula A below $$RO(CH_2CH_2O)_nH$$

wherein R is

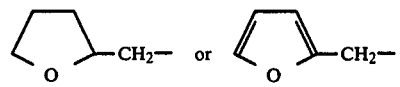

and n* is about 0.5 to about 10; said ingredients being present in an amount effective to remove the siccative coating from a substrate coated therewith. Preferably, the ingredients are present in an amount effective to strip cathodic electrodeposition paint from a substrate coated therewith in about 5 seconds to about 1 hour at a composition temperature of about 180° to about 220° F. As will be discussed and exemplified in more detail below, the unique combination of ingredients comprising the composition exhibits synergistic effects.

*n represents the number of moles of ethylene oxide per mole of ROH (reacted and unreacted) in the reaction product of ethylene oxide and either furfuryl alcohol or tetrahydrofurfuryl alcohol, i.e., n represents the average degree of ethoxylation. For example, when n is one, a mixture containing predominantly monoethoxylated furfuryl or tetrahydrofurfuryl alcohol with small quantities of the unreacted alcohol and small quantities of polyethoxylated alcohol will be present. When n is a fraction less than one, relatively larger quantities of unreacted alcohol will be present in the mixture. When n is greater than one, relatively larger quantities of polyethoxylated alcohols will be present.

Preferably, the composition contains a sequestering agent in an amount effective to substantially present precipitation, a composition-stabilizing compound selected from the group consisting of aliphatic primary alcohols, aliphatic secondary alcohols, alkylamines and mixtures thereof in an amount effective to substantially prevent separation of the composition upon standing, and/or one or more surfactants at a concentration of about 0.5 to about 20 g/l. While effective compositions may be formulated that do not contain any of the aforementioned, it is preferred that one or more of these three compounds be present in the hot stripper composition of the invention.

The total amount of the ingredients comprising the mixture of at least two of the materials THFA and the aforementioned ethoxylated materials should be preferably at least about 7.5 g/l, with at least two of the ingredients each being present in an amount of at least about 2.5 g/l.

DETAILED DESCRIPTION OF THE INVENTION

The alkaline compound for use in the composition of the invention may be any of the compounds known to the art that produce a strongly alkaline solution when dissolved in water. Preferably, the alkaline compound is supplied in the form of a compound selected from the group consisting of alkali metal and ammonium hydroxides, carbonates, silicates and phosphates, and amines, and mixtures thereof. Particularly preferred as the alkaline compound is a mixture of one or more alkali metal hydroxides. Even more preferred as the alkaline compound is a mixture of sodium hydroxide and potassium hydroxide.

The alkaline compound is present in the aqueous alkaline composition of the invention as one or more of the aforesaid alkaline compounds in an amount effective to impart a pH to the composition of about 9.6 to about 14+, preferably about 12 to about 14+. Generally, more of the alkaline compound will be required when the composition is employed at lower temperatures than will be required at higher temperatures. Preferably, the amount of alkaline compound in the composition is at least about 80 g/l, and more preferably, about 150 to about 350 g/l.

Another material which can be used in the composition of the present invention is tetrahydrofurfuryl alcohol (hereinafter referred to as "THFA"). It is known to use this material in stripping compositions, including in combination with furfuryl alcohol. As will be seen from the test data reported below, the use of THFA in combination with the ethoxylated alcohol yields improved results. The effectiveness of a composition containing both the ethoxylated material described below and THFA in stripping siccative coatings from substrates coated therewith has been found to be greater than that of a composition containing either of ingredients in equivalent amounts, thus evidencing a synergistic action. THFA is preferably used in a concentration of at least about 2.5 g/l, and more preferably, at about 2.5 to about 200 g/l. Amounts within the range of about 4 to about 100 g/l can be used effectively also.

The use of the ethoxylated constituent of Formula A above exhibits the following advantages. It does not form an azeotrope with water as does furfuryl alcohol, and therefore, it not rapidly depleted from a working bath by non-functional mechanisms as is furfuryl alcohol. Accordingly, the ethoxylated material remains in the bath and increased effectiveness (more coating stripped/volume of composition) and longer bath life are experienced.

Thus, a bath of an exemplary composition of the invention can be used to strip siccative coatings from substrates coated therewith for a period of time that is two to three times longer than is possible with compositions containing furfuryl alcohol or furfuryl alcohol and tetrahydrofurfuryl alcohol. Thus, bath life is significantly extended.

A preferred ethoxylated constituent is the reaction product of furfuryl alcohol and ethylene oxide wherein n, in Formula A above, is about 0.5 to about 1.5. Particularly preferred is such a product in which n is about 0.85 to about 1.08.

Another preferred ethoxylated constituent is the reaction product of tetrahydrofurfuryl alcohol and ethylene oxide wherein n, in Formula A above, is about 3 to about 8.

The ethoxylated material is used in the composition in an effective amount which will depend on the type of siccative coating to be removed, as well as on the thickness of the coating. Higher amounts are generally required to remove a siccative coating such as a cathodic electrodeposition paint than is required to remove a coating such as an alkyd paint. Preferably, the ethoxylated material is present in an amount effective to remove cathodic electrodeposition paint from a substrate coated therewith in about 5 seconds to about 1 hour at a composition temperature of about 180° to about 220° F. These measurements are made for a fresh composition, that is, a composition that has not previously been used to strip siccative coatings. Preferably, the ethoxylated material will be present in an amount of at least about 5 g/l, and more preferably, within the range of about 5 to about 200 g/l. A particularly preferred amount is about 20 to about 50 g/l. Amounts within the range of about 10 to about 100 g/l can be used effectively also.

It has been discovered that the addition of a sequestering agent to the composition of the invention provides a composition that may be effectively employed regardless of the hardness of the water used to formulate the composition without generally experiencing precipitation of the calcium and magnesium ions that cause water hardness, and additionally, its use improves the ability of the compositions to remove siccative coatings from substrates coated therewith. It is believed that the sequestering agent aids in breaking the bond between the substrate and the paint film through superficial action on the substrate.

Representative of the sequestering agents which may be employed in the compositions of the invention are hydroxy-carboxylic acids such as gluconic, citric, and tartaric acids, aminopolycarboxylic acids, such as ethylenediaminetetraacetic acid, and various commercial preparations, such as Belzak AC, manufactured by Belzak Corporation. Preferably, the sequestering agent is selected from the group consisting of gluconic acid, Belzak AC, and mixtures thereof.

The sequestering agent is preferably added in an amount effective to substantially prevent precipitation of the calcium and magnesium ions that are the primary cause of water hardness. Generally, greater amounts of the sequestering agent will be required when the hardness of the water is high than when the hardness of the water is low. Preferably, the amount of sequestering agent will be at least about 1 g/l, and more preferably, about 1 to about 100 g/l.

Additional benefits may be realized by use of a composition-stabilizing compound selected from the group consisting of aliphatic primary alcohols, aliphatic secondary alcohols, alkyl amines and mixtures thereof. This constituent may be characterized as a secondary solvent miscible in water which functions to provide a more uniform solution that will not separate upon standing. Additionally, such constituent is believed to increase the effectiveness of the composition by functioning to dissolve soaps that are formed by reaction of the siccative coating with the alkaline compound, thereby rendering the soaps ineffective to hinder further such reaction.

Preferably, the composition-stabilizing compound is selected from the group consisting of methanol, monoethanolamine, diethylene glycol, propylene glycol, dipropylene glycol, n-butyl amine, and mixtures thereof. More preferably, this constituent is selected from the group consisting of methanol, monoethanolamine, diethylene glycol, n-butyl amine, and mixtures thereof.

The composition-stabilizing compound can be used in an amount effective to substantially prevent separation of the composition of the invention. Preferably, the composition-stabilizing compound is added in an amount of at least about 10 g/l and more preferably at about 50 to about 200 g/l.

It is preferred, but not essential, to add one or more surfactants to the composition of the invention. Surfactants or wetting agents may serve to deterge and emulsify plasticizers or other components of lower molecular weights in the film of the siccative coating, thereby promoting removal thereof. The particular surfactant or wetting agent employed is not critical and amphoteric, nonionic and/or anionic surfactants may be employed. Preferred surfactants are Miranol JEM Concentrate, manufactured by Miranol Chemical Co. and Sulfonate OA-5, manufactured by Cities Service Co.

When a surfactant is added, it is preferred that the composition contain at least about 0.5 g/l of one or more surfactants. A particularly preferred amount is from about 0.5 to about 20 g/l.

A preferred aqueous alkaline composition for use at elevated temperatures to remove siccative coatings from substrates coated therewith contains an alkaline component in an amount of about 150 to about 350 g/l, said alkaline component comprising about 3.5 to about 350 g/l of sodium hydroxide, about 3.5 to about 350 g/l of potassium hydroxide, about 1 to about 100 g/l of a sequestering agent, about 50 to about 100 g/l of a composition-stabilizing compound selected from the group consisting of methanol, monoethanolamine, diethylene glycol, n-butyl amine and mixtures thereof, about 2.5 to about 200 g/l of tetrahydrofurfuryl alcohol, and about 5 to about 200 g/l of a material comprising the reaction product of furfuryl alcohol and ethylene oxide and represented by Formula A above, wherein n, in Formula A, is about 0.5 to about 1.5. Preferably, n is about 0.85 to about 1.08. It is also preferred to add one or more surfactants in an amount of about 0.5 to about 20 g/l.

Siccative coatings may be stripped from substrates coated therewith by contacting the coated substrate with the hot stripper composition at a composition temperature effective and for a time sufficient to remove the siccative coating from the substrate. Hot strippers are generally employed at elevated temperatures and are preferably maintained at a rolling boil. The compositions of the invention are preferably employed at a temperature of at least about 140° F., and more preferably, at about 180° to about 220° F.

The time of contact of the composition with the substrate that is sufficient to remove the siccative coating from the substrate will depend on a number of factors, including the nature of the siccative coating, the number of substrates previously contacted with the composition, the temperature of the composition, the total coated surface area of the substrate in contact with the composition, the thickness of the siccative coating, and the concentration of various of the constituents. Generally, contact times effective to remove the siccative coating from a substrate coated therewith will be within the range of about 5 seconds to about 1 hour at a temperature within the range of about 180° to about 220° F. for a fresh composition, that is, a composition that has not previously been used to remove the siccative coatings. In general, the contact time required to remove the siccative coating will tend to increase when any one or more of the following occurs: the temperature of the composition is decreased, the number of coated substrates previously contacted with the composition is increased, the surface area of coated substrate in contact with the composition is increased, the thickness of the coating to be stripped is increased, or the concentration of the composition-activating compound of the invention is decreased.

The coated substrates to be stripped may be contacted with the compositions of the invention according to any of the methods known to the art. Generally, the coated substrate to be stripped will be immersed in a bath of the composition. Once the siccative coating is removed, the substrate will preferably be rinsed with water and then dried.

The hot stripper may be formulated as an aqueous concentrate that is diluted with water to produce the aqueous alkaline composition of the invention.

As an aqueous concentrate, the working composition is formulated such that when the aqueous concentrate is added to water at a concentration of about 10 to about 99% by volume, it produces an aqueous alkaline composition which has a pH within the range of about 9.5 to about 14+, and which is effective at elevated temperatures in removing siccative coatings from substrates coated therewith. The aqueous concentrate is preferably added to water at a concentration of about 40 to about 60% by volume and includes an alkaline component, as defined above, in an amount effective to impart a pH of about 12 to about 14+ to the composition produced when the concentrate is added to water. The alkaline component may preferably be present in the concentrate at about 10 to about 50wt. %.

Preferably, the THFA and ethoxylated material are present in the concentrate in an amount such that the composition produced by diluting the concentrate contains the aforementioned ingredients in amounts effective to remove cathodic electrodeposition paint from a substrate coated therewith in about 5 seconds to about 1 hour at a composition temperature of about 180° to about 220° F. The THFA will typically comprise about 1 wt. %, and preferably, about 1 to about 10 wt. % of the concentrate, and the ethoxylated material is preferably present in the concentrate in an amount of at least about 1 wt. %, and more preferably, about 1 to about 20 wt. %.

The concentrate may optionally contain one or more of the following components, each as defined above: a sequestering agent in an amount of at least about 0.1 wt. % and more preferably, about 0.1 to about 10 wt. %; a composition-stabilizing compound in an amount of at least about 1 wt. % and more preferably, about 1 to about 20 wt. %; and one or more surfactants at a concentration of at least about 0.1 wt. % and preferably, about 0.1 to about 10 wt. %.

A particularly preferred concentrate contains: about 10 to about 85 wt. % water; an alkaline component in an amount of about 10 to about 50 wt. %, said alkaline component comprising about 0.5 to about 50 wt. % of sodium hydroxide, about 0.5 to about 50 wt. % of potassium hydroxide; about 0.1 to about 10 wt. % of a sequestering agent; about 1 to about 20 wt. % of a composition-stabilizing compound selected from the group consisting of methanol, monoethanolamine, diethylene glycol, n-butyl amine, and mixtures thereof; about 1 to about 10 wt. % of THFA; and about 1 to about 20 wt. % of the reaction product of furfuryl alcohol and ethylene oxide represented by Formula A above, wherein n is about 0.5 to about 1.5, most preferably about 0.85 to about 1.08. This preferred concentrate contains one or more surfactants at a concentration of about 0.1 to about 10 wt. %.

Although the ethoxylated constituent of the invention may be characterized as non-volatile as compared to furfuryl alcohol, which property allows for increased effectiveness and bath life over those compositions containing furfuryl alcohol, the ethoxylated constituent is gradually depleted during continuous use of the composition to strip siccative coatings from numerous substrates. It is, therefore, desirable to replenish a bath of the composition during continuous use. The point in time during the continuous use of such a bath at which replenishment is required may be readily determined by monitoring the time required to strip a siccative coating from a substrate. As the activator is depleted, this time will increase, eventually reaching a required time that is commercially unacceptable. Thus, with repeated use of the composition of the invention, the time at which addition of a replenishing composition is required may be readily determined.

In replenishing the composition, it is preferred to increase the concentration of the ethoxylated material to about its initial concentration without increasing the concentration of alkaline compound in the composition to a concentration greater than the concentration in the initial composition. Accordingly, the replenisher composition of the invention will generally contain a higher concentration of the ethoxylated material and a lower concentration of the alkaline compound than may be desirable in the hot stripper composition.

A composition for use in replenishing the composition of the invention will contain one or more alkaline compounds as defined above and in an amount effective to impart a pH to the replenisher of about 9.5 to about 14+, preferably about 12 to about 14+. Preferably, the replenisher comprises about 1 to about 200 g/l of the alkaline compound, about 20 to about 200 g/l of the ethoxylated material, and at least about 50 g/l, preferably about 20 to about 200 g/l of THFA.

Though not required, it is preferred to add one or more of the following components, each as defind above, to the replenisher: a sequestering agent in an amount of about 2.5 to about 100 g/l; a composition-stabilizing compound in an amount of about 10 to about 200 g/l; and one or more surfactants in an amount of about 1 to about 100 g/l.

Although the replenisher has primary applicability in replenishing the hot stripper composition of the invention, it has been discovered that the replenishing composition may effectively be employed to replenish those prior art compositions containing furfuryl alcohol and/or THFA.

The following examples present illustrative, but non-limiting embodiments of the present invention.

EXAMPLES

The reaction product of furfuryl alcohol and ethylene oxide (FA/ETO) employed in the following examples is a product manufactured by the Quaker Oats Company, Chicago, Ill., which is represented by Formula A above, wherein n is about 0.86 to about 1.08. It may be further defined by the following experimentally determined values: specific gravity, 1.132–1.134 at 25° C.; refractive index, $N_d^{20} = 1.4844$–1.4846; flash point (approx.) 225° F.; hydroxyl number, 400±14; Gardner color, 18; viscosity, 13 cps.

EXAMPLES NOS. 1 TO 3

Concentrates 1, 2 and 3 were prepared having the indicated components in the indicated concentrations. Stripping positions 1, 2 and 3 were prepared, each from the concentrate bearing the same number, by diluting a given volume of the concentrate with an equal volume of water.

| Ingredient | Concentrate 1 (wt. %) | Composition 1 (g/l) |
|---|---|---|
| H₂O | 8.0 | |
| Belzac AC (manuf. by Belzac Corp.) | 1.5 | 10.31 |
| NaOH (50%) | 34.0 | 233.75 |
| KOH (50%) | 32.0 | 220.00 |
| diethylene glycol | 10.0 | 68.75 |
| furfuryl alcohol/ethylene oxide | 9.0 | 61.88 |
| tetrahydrofurfuryl alcohol | 5.0 | 34.38 |
| Miranol JEM Conc. (manuf. by Miranol Chemical Co.) | 0.5 | 3.44 |
| | 100.0 | |

| Ingredient | Concentrate 2 (wt. %) | Composition 2 (g/l) |
|---|---|---|
| H₂O | 8.0 | |
| Belzac AC (manuf. by Belzac Corp.) | 1.5 | 10.59 |
| NaOH (50%) | 30.0 | 211.80 |
| KOH (50%) | 30.0 | 211.80 |
| diethylene glycol | 13.0 | 91.78 |
| furfuryl alcohol/ethylene oxide | 9.0 | 63.54 |
| tetrahydrofurfuryl alcohol | 5.0 | 35.30 |
| monoethanolamine | 1.0 | 7.06 |

-continued

| Ingredient | Concentrate (wt. %) | Composition (g/l) |
| --- | --- | --- |
| Dowanol EPh (manuf. by Dow Chemical Co.) (added as a composition-stabilizing compound) | 1.0 | 7.06 |
| Sulfanate OA-5 (manuf. by Cities Service Co.) | 1.0 | 7.06 |
| Miranol JEM Conc. (manuf. by Miranol Chemical Co.) | 0.5 | 3.53 |

| Ingredient | Concentrate 3 (wt. %) | Composition 3 (g/l) |
| --- | --- | --- |
| H$_2$O | 11.0 | |
| Belzac AC (manuf. by Belzac Corp.) | 1.5 | 10.22 |
| NaOH (50%) | 34.0 | 231.54 |
| KOH (50%) | 32.0 | 217.92 |
| diethylene glycol | 10.0 | 68.10 |
| furfuryl alcohol/ethylene oxide | 6.0 | 40.86 |
| tetrahydrofurfuryl alcohol | 5.0 | 34.5 |
| Miranol JEM Conc. (manuf. by Miranol Chemical Co.) | 0.5 | 3.41 |

Three baths, each comprising one of the compositions, were maintained at a temperature within the range of 210°-220° F. during the course of use, except as otherwise noted below. Equal volumes of Composition 1, Composition 2, and Compositions 3 were employed.

Five sets of 4"×12" steel panels (3 panels per set) coated with a cathodic electrodeposition paint were employed in this experiment. One third of the panels in each set were immersed in Composition 1, the second in Composition 2, and the last third in Composition 3.

The experiment was designed to simulate continuous use of the compositions to strip numerous panels. A description of the test conditions and results of testing are set forth in Table 1 below.

TABLE 1

| Bath Conditions and Sequence of Alteration Thereof | Panel Immersion Time/Percentage of Paint Removed From Panels During Said Immersion Time | | |
| --- | --- | --- | --- |
| | Composition 1 | Composition 2 | Composition 3 |
| initial bath; no paint added; no panels previously immersed therein first set of panels immersed | 6-7 mins./100% | 6-7 mins./100% | 8-9 mins./100% |
| panels removed; 5 grams of paint added to each bath; baths maintained at a boil for about 15 minutes second set of panels immersed | 8-8¼ mins./100% | 8¼ mins./100% | 11-12 mins./100% |
| panels removed; 5 grams of paint added to each bath; baths maintained at a boil for about 15 minutes third set of panels immersed | 10-11 mins./100% | 9-10 mins./100% | 13 mins./100% |
| panels removed; 5 grams of paint added to each bath; baths maintained at a boil for about 15 minutes fourth set of panels immersed | 12 mins./100% | 10-11 mins./100% | 16 mins./100% |
| panels removed; 5 grams of paint added to each bath; baths maintained at a boil for about 15 minutes fifth set of panels immersed | 20 mins./100% | 17-18 mins./100% | 20 mins./60-70% |

EXAMPLES 4 AND 4-A

Concentrate 4 was prepared containing the ingredients and concentrations thereof noted below. Two compositions were prepared from the concentrate. Composition 4 was formulated by diluting a given volume of Concentrate 4 with an equal volume of water. Composition 4-A was prepared by diluting a given volume of Concentrate 4 with sufficient water to form a solution comprising 45% by volume of Composition 4. Equal volumes of Composition 4 and 4-A were employed in stripping operations.

| Ingredient | Concentrate 4 (wt. %) | Composition 4 (g/l) | Composition 4-A (g/l) |
| --- | --- | --- | --- |
| H$_2$O | 7.0 | | |
| Belzac AC (manuf. by Belzac Corp.) | 1.5 | 10.34 | 9.32 |
| NaOH (50%) | 34.0 | 234.80 | 211.32 |
| KOH (50%) | 34.0 | 234.80 | 211.32 |
| diethylene glycol | 12.0 | 82.87 | 74.58 |
| furfuryl alcohol/ ethylene oxide | 6.0 | 41.44 | 37.29 |
| tetrahydrofur- | | | |

-continued

| Ingredient | Concentrate 4 (wt. %) | Composition 4 (g/l) | Composition 4-A (g/l) |
|---|---|---|---|
| furyl alcohol | 5.0 | 34.53 | 31.08 |
| Miranol JEM Conc. (manuf. by Miranol Chemical Corp.) | 0.5 | 3.45 | 3.11 |
|  | 100.0 | | |

Using sets of 1"×4" steel panels coated with cathodic electrodeposition paint, the time required to remove 100% of the paint from the panels immersed in the two compositions at various composition temperatures was recorded. At each temperature, 1 panel was immersed in Composition 4 and 1 panel was immersed in Composition 4-A. The results are summarized in Table 2 below.

TABLE 2

| Composition Temperature | Time Required to Strip 100% Of Paint From Panels Immersed In Composition | |
|---|---|---|
|  | Composition 4 | Composition 4-A |
| 200° F. | 3–4 mins. | 5½–6 mins. |
| 210° F. | 4–5 mins. | 6–7 mins. |
| 200° F. | 7–7¼ mins. | 8–9 mins. |
| 190° F. | 8–9 mins. | 9¼ mins. |

The ability of Composition 4 to strip paint from 4"×12" steel panels coated with a black, cathodic electrodeposition paint was evaluated. A total of 46 panels was tested. At successive points in the time during continuous use, a single panel was immersed in Composition 4 and the time of immersion required to remove the indicated percentage of paint from each panel recorded. In between these measurements, identical panels were immersed in the composition until 100% of the paint had been removed therefrom and then removed. This simulated the bath loading conditions encountered in commercial use. The results are summarized in Table 3 below.

TABLE 3

| Number of Panels Immersed | Composition Temperature (°F.) | Immersion Time (Mins.) | % of Paint Stripped During Time Immersed Composition 4 |
|---|---|---|---|
| 1 | 190 | 5–5¼ | 60 |
|  | 190 | 8–9 | 100 |
| 1 | 200 | 4–5 | 50 |
|  | 200 | 7–7¼ | 100 |
| 1 | 210 | 3–3½ | 80–90 |
|  | 210 | 4–5 | 100 |
| 5 | 210–220 | — | 100 |
| 4 | 210–220 | — | 100 |
| 5 | 210–220 | — | 100 |
| 1 | 200 | 6–7 | 90–95 |
|  | 200 | 7¼–8 | 100 |
| 5 | 210–220 | — | 100 |
| 5 | 210–220 | — | 100 |
| 1 | 200 | 8–8¼ | 100 |
| 5 | 210–220 | — | 100 |
| 5 | 210–220 | — | 100 |
| 1 | 200 | 10–10¼ | 100 |
|  | 200 | 12–12¼ | 100 |
| 5 | 210–220 | — | 100 |
| 1 | 200 | 11–11¼ | 100 |
|  | 200 | 15–15¼ | 100 |

The experimental sequence summarized in Table 3 was continued until 100% of the paint could no longer be stripped from an immersed panel. The total painted surface area of those panels from which 100% of the paint had been stripped was calculated and divided by the volume of the composition employed. The results are summarized in Table 4 below.

TABLE 4

|  | Composition 4 |
|---|---|
| Painted Surface Area Stripped/Volume of Composition | 28 sq. ft./gallon |

EXAMPLE 5

An aqueous alkaline solution, Composition 5, was prepared for use in replenishing compositions of the present invention, as well as those prior art compositions containing furfuryl alcohol or furfuryl alcohol and tetrahydrofurfuryl alcohol. Composition 5 may be added to such compositions after continuous use thereof in order to extend the operability of such compositions.

| Composition 5 | |
|---|---|
| Ingredient | % by Wt. |
| $H_2O$ | 34.8 |
| Belzac AC (manuf. by Belzac Corp.) | 0.5 |
| NaOH (50%) | 10.0 |
| KOH (45%) | 10.0 |
| diethylene glycol | 18.0 |
| furfuryl alcohol/ethylene oxide | 10.0 |
| tetrahydrofurfuryl alcohol | 2.0 |
| Miranol JEM Conc. (manuf. by Miranol Chemical Co.) | 2.0 |
| methanol | 14.5 |
|  | 100.0 |

Comparative tests which exemplify the synergistic properties of compositions within the scope of the present invention are the subject of the next group of examples. The following control composition was prepared.

| COMPOSITION C | |
|---|---|
|  | % By Weight |
| $H_2O$ | 26.5 |
| NaOH (50%) | 34.0 |
| KOH (50%) | 34.0 |
| Miranol JEM Conc. | 0.5 |
| methanol | 5.0 |

Control Composition C was used as a base to prepare the various compositions identified in Table 5 below and those compositions, as well as Composition C, were used to strip the paint from steel panels that were painted with cathodically electrodeposited green paint films having thicknesses of 1 to 1.5 mil. Painted panels were immersed in the freshly prepared compositions referred to in Table 5 and maintained therein until 100% of the film was stripped. The times required to accomplish this were recorded and are reported in Table 5. The compositions were then subjected to a rolling boil for six hours and thereafter were used to strip the paint from steel panels painted like those referred to just above. The times to strip 100% of the paint films from the panels were recorded and are reported in Table 5. The ethoxylated THFA used in various of the compositions referred to in Table 5 is represented by Formula A above wherein n is about 1.5 and is referred to in the table as "THFA/ETO".

TABLE 5

| Ex. No. | Comp. | Stripping Time in Minutes Fresh Comp. (88° C.-99° C.) | Boiled Comp. (99° C.-105° C.) |
|---|---|---|---|
| C-1 | 100 g of C | 31 | not effective in 45 min. |
| C-2 | 90 g of C and 10 g furfuryl alcohol | 8 | 23¼ |
| C-3 | 90 g of C and 10 g of FA/ETO | 9¼ | 10¼-11 |
| C-4 | 90 g of C and 10 g of THFA | 9 | 10¼ |
| C-5 | 90 g of C and 10 g of THFA/ETO | 10 | 13 |
| C-6 | 90 g of C, 5 g of furfuryl alcohol, 5 g THFA | 6 | 17¼ |
| C-7 | 90 g of C, 5 g of furfuryl alcohol and 5 g of THFA/ETO | 6 | 18¼ |
| 6 | 90 g of C, 5 g of FA/ETO and 5 g of THFA | 6¼-7 | 10¼-11 |
| 7 | 90 g of C, 5 g of FA/ETO and 5 g of THFA/ETO | 7¼-8 | 11 |
| 8 | 90 g of C, 5 g of THFA and 5 g THFA/ETO | 7¼ | 11-11¼ |
| 9 | 85 g of C, 5 g of furfuryl alcohol, 5 g of FA/ETO and 5 g THFA | 4 | 9¼ |
| 10 | 85 g of C, 5 g of FA/ETO, 5 g of THFA and 5 g of THFA/ETO | 5¼ | 6¼-7 |

A comparison of the results obtained utilizing the inventive compositions of Example Nos. 6, 7 and 8 of Table 5 above with those obtained when using the compositions of Examples C-2 to -6 reveals the synergistic effects which are produced by compositions within the scope of the present invention. The loss of effectiveness of a composition including furfuryl alcohol as it is subjected to elevated temperature for prolonged periods is exemplified by the results shown for the compositions of Examples C-6 and C-7. The compositions of Example Nos. 9 and 10 show the improved results that can be achieved by utilizing higher amounts of various of the activating ingredients.

While the present invention is particularly applicable to the removal or stripping of siccative coatings as defined above and described in the examples, it should be understood that the strongly alkaline solutions of the invention may be employed in other applications. Such uses are not intended to be excluded by the description of the invention in connection with siccative coatings.

I claim:

1. An aqueous alkaline composition for use at elevated temperatures to remove siccative coatings from substrates coated therewith comprising one or more alkaline compounds in an amount effective to impart a pH to the composition of about 9.5 to about 14+ and at least two of the following three materials: tetrahydrofurfuryl alcohol and the ethoxylated materials of the formula $$RO(CH_2CH_2O)_nH$$

wherein R is

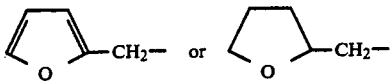

and n is about 0.5 to about 10, said ingredients being present in amounts effective to remove the siccative coating from a substrate coated therewith.

2. A composition according to claim 1 wherein the alkaline compound is present in an amount effective to impart a pH to the composition of about 12 to about 14+.

3. A composition according to claim 1 including a sequestering agent in an amount effective to substantially prevent the formation of precipitants in the composition.

4. A composition according to claim 3 including a composition-stabilizing compound selected from the group consisting of aliphatic primary alcohols, aliphatic secondary alcohols, alkyl amines, and mixtures thereof, said composition-stabilizing compound being present in an amount effective to substantially prevent separation of said composition.

5. A composition according to claim 1 including at least about 80 g/l of said alkaline compound, at least about 1 g/l of a sequestering agent, and at least about 10 g/l of a composition-stabilizing compound selected from the group consisting of aliphatic primary alcohols, aliphatic secondary alcohols, alkyl amines and mixtures thereof.

6. A composition according to claim 5 wherein the ethoxylated material is the reaction product of furfuryl alcohol and wherein n is about 0.5 to 1.5.

7. A composition according to claim 6 wherein n is about 0.85 to about 1.08.

8. A composition according to claim 5 wherein the ethoxylated material is the reaction product of tetrahydrofurfuryl alcohol and wherein n is about 3 to about 8.

9. A composition according to claim 5 wherein the alkaline compound is selected from the group consisting of alkali metal and ammonium hydroxides, carbonates, silicates and phosphates, and amines, and mixtures thereof.

10. A composition according to claim 5, 6 or 7 wherein the ethoxylated material is present in an amount of at least about 5 g/l.

11. A composition according to claim 5 including at least about 0.5 g/l of one or more surfactants.

12. A composition according to claim 1 comprising an alkaline component in an amount of about 150 to about 350 g/l, said alkaline component comprising about 3.5 to about 350 g/l of sodium hydroxide and about 3.5 to about 350 g/l of potassium hydroxide, about 1 to about 100 g/l of a sequestering agent, about 50 to about 100 g/l of a composition-stabilizing compound selected from the group consisting of methanol, monoethanolamine, diethylene glycol, n-butyl amine and mixtures thereof, about 2.5 to about 200 g/l of tetrahydrofurfuryl alcohol, and about 5 to about 200 g/l of an ethoxylated material.

13. A composition according to claim 12 wherein n is about 0.85 to about 1.08.

14. A method of stripping siccative coatings from substrates coated therewith comprising contacting the coated substrate with the composition of claim 1, 5 or 12 at a composition temperature effective and a time sufficient to remove the siccative coating from the substrate.

15. An aqueous concentrate which when added to water at a concentration of about 10 to about 99% by volume produces an aqueous alkaline composition according to claim 1, 5 or 12.

16. An aqueous concentrate for use in forming an aqueous alkaline solution which is effective at elevated temperatures in stripping siccative coatings from substrates coated therewith, comprising about 10 to about 85 wt. % water, an alkaline component in an amount of about 10 to about 50 wt. %, said alkaline component comprising about 0.5 to about 50 wt. % of sodium hydroxide and about 0.5 to about 50 wt % of potassium hydroxide, about 0.1 to about 10 wt. % of a sequestering agent, about 1 to about 20 wt. % of a composition-stabilizing compound selected from the group consisting of methanol, monoethanolamine, diethylene glycol, n-butyl amine, and mixtures thereof, about 1 to about 10 wt. % of tetrahydrofurfuryl alcohol and about 1 to about 20 wt. % of the reaction product of furfuryl alcohol and ethylene oxide represented by the formula of claim 1 wherein n is about 0.5 to about 1.5.

17. The concentrate of claim 16 wherein n is about 0.85 to about 1.08.

18. An aqueous composition for use in replenishing a hot stripper composition, comprising one or more alkaline compounds in an amount of about 1 to about 200 g/l, at least about 200 g/l of tetrahydrofurfuryl alcohol, and an ethoxylated material as defined in claim 1 in an amount of about 20 to about 200 g/l.

19. A method according to claim 14 wherein the siccative coating is a cathodically electrodeposited paint film.

20. A composition according to claim 1 wherein the total amount of the ingredients comprising the mixture of at least two of the said materials THFA and said ethoxylated materials is at least about 7.5 g/l, with at least two of said ingredients each being present in an amount of at least about 2.5 g/l.

21. A composition according to claim 1 including about 4 to about 100 g/l of said tetrahydrofurfuryl alcohol.

22. A composition according to claim 1 including about 10 to about 100 g/l of said ethoxylated material.

* * * * *